United States Patent
Yamamura et al.

(10) Patent No.: US 9,476,561 B2
(45) Date of Patent: Oct. 25, 2016

(54) VEHICLE LAMP INCLUDING IMAGE FORMING DEVICE AND METHOD FOR CONTROLLING THE SAME

(71) Applicant: KOITO MANUFACTURING CO., LTD., Tokyo (JP)

(72) Inventors: Satoshi Yamamura, Shizuoka (JP); Takayuki Yagi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/411,238

(22) PCT Filed: May 15, 2013

(86) PCT No.: PCT/JP2013/063525
§ 371 (c)(1),
(2) Date: Dec. 24, 2014

(87) PCT Pub. No.: WO2014/002630
PCT Pub. Date: Jan. 3, 2014

(65) Prior Publication Data
US 2015/0191115 A1    Jul. 9, 2015

(30) Foreign Application Priority Data

Jun. 29, 2012    (JP) .................................. 2012-146195

(51) Int. Cl.
*F21S 8/10*    (2006.01)
*G02B 26/08*    (2006.01)

(52) U.S. Cl.
CPC ........ *F21S 48/1731* (2013.01); *F21S 48/1154* (2013.01); *F21S 48/1225* (2013.01);
(Continued)

(58) Field of Classification Search
CPC ............. F21S 48/1757; F21S 48/1752; F21S 48/1726; F21S 48/12; F21S 48/1208; F21S 48/1216; F21S 48/1225; F21S 48/1233; F21S 48/1241; F21S 48/125; F21S 48/1258; F21S 48/1266; F21S 48/1275; F21S 48/1283; F21S 48/1291; F21S 48/14; B60Q 1/04
See application file for complete search history.

(56) References Cited

U.S. PATENT DOCUMENTS 4,985,816 A * 1/1991 Seko ..................... B60Q 1/0023
362/268
5,161,875 A * 11/1992 Sekiguchi .............. B60Q 1/076
362/277

(Continued)

FOREIGN PATENT DOCUMENTS

JP    04-081337 A    3/1992
JP    09-104288 A    4/1997

(Continued)

OTHER PUBLICATIONS

Search Report dated Aug. 20, 2013, issued by the International Searching Authority in counterpart International Application No. PCT/JP2013/063525.

(Continued)

*Primary Examiner* — Robert May
(74) *Attorney, Agent, or Firm* — Sughrue Mion, PLLC (57) ABSTRACT

A vehicle lamp that can form a light distribution pattern required therefor effectively even with the existing DMD is provided. A vehicle lamp 1 includes a projection lens 6, a two-dimensional image forming device 10, 30 including a projection surface 11 positioned near a rear focal point F of the projection lens, and a light source 4 configured to irradiate the two-dimensional image forming device 10 with light, wherein the projection surface 11 is formed by a plurality of optical elements 12 that can be driven independently of the others, in the projection surface 11, illumination patterns 14a, 14b can be formed simultaneously and individually on a plurality of projection areas 13a, 13b, and the plurality of illumination patterns 14a, 14b are projected to the front of the lamp by the projection lens 6 so as to form a single or a plurality of light distribution patterns 20.

9 Claims, 9 Drawing Sheets

(52) U.S. Cl.
CPC ........ *F21S48/1258* (2013.01); *F21S 48/1388* (2013.01); *F21S 48/14* (2013.01); *F21S 48/1757* (2013.01); *G02B 26/0833* (2013.01)

(56) References Cited

U.S. PATENT DOCUMENTS

| | | | |
|---|---|---|---|
| 5,938,319 A | 8/1999 | Hege | |
| 7,347,595 B2 * | 3/2008 | Brun | B60Q 1/0011 340/435 |
| 9,108,566 B2 * | 8/2015 | Simchak | B60Q 1/12 |
| 2007/0147055 A1 | 6/2007 | Komatsu | |
| 2008/0043481 A1 | 2/2008 | Yokoyama et al. | |
| 2011/0013412 A1 | 1/2011 | Kobayashi | |

FOREIGN PATENT DOCUMENTS

| | | |
|---|---|---|
| JP | 2007-179969 A | 7/2007 |
| JP | 2011-023157 A | 2/2011 |
| WO | 2005/080859 A1 | 9/2005 |

OTHER PUBLICATIONS

Written Opinion dated Aug. 20, 2013, issued by the International Searching Authority in counterpart International Application No. PCT/JP2013/063525.

* cited by examiner

VEHICLE LAMP INCLUDING IMAGE FORMING DEVICE AND METHOD FOR CONTROLLING THE SAME

TECHNICAL FIELD

The present invention relates to a vehicle lamp that is mounted on a vehicle and a control method therefor.

BACKGROUND ART

Patent Document 1 proposes an illumination device that uses a DMD (Digital Micromirror Device) that includes several hundreds to hundred thousands microscopic reflecting elements. Patent Document 1 proposes that the characteristics of a pencil of light emitted from the illumination device are changed simply over a wide range by the individual reflecting elements of the DMD.

CITATION LIST

Patent Document

Patent Document 1: JP-A-9-104288

SUMMARY OF INVENTION

Technical Problem

Incidentally, a light distribution pattern formed by a vehicle lamp is larger horizontally than vertically in order to enhance the visibility of a pedestrian or an obstacle situated on a left- or right-hand side edge of a road on which the vehicle is running. However, in a DMD that is used in a commercially marketed television set or a projector, for example, there is not much difference between a vertical dimension and a horizontal dimension. Therefore, in the event that a light distribution pattern is formed by a vehicle lamp that uses such a DMD as it is, since there remain reflecting elements that are not used, using the DMD in that way becomes inefficient.

Then, an object of the invention is to provide a vehicle lamp that can form a light distribution pattern required therefor effectively even with the existing DMD and a method for controlling the vehicle lamp.

Solution to Problem

A vehicle lamp of the invention which can solve the problem comprises:
a projection lens;
a two-dimensional image forming device including a projection surface positioned near a rear focal point of the projection lens; and
a light source configured to irradiate the two-dimensional image forming device with light, wherein
the projection surface is formed by a plurality of optical elements that can be driven independently of the others,
in the projection surface, illumination patterns can be formed simultaneously and individually on a plurality of projection areas, and
the plurality of illumination patterns are projected to the front of the lamp by the projection lens so as to form a single or a plurality of light distribution patterns.

In the vehicle lamp, at least two illumination patterns may be projected so as to overlap each other partially by the projection lens to form the single light distribution pattern.

In the vehicle lamp, part of the illumination patterns that are projected so as to overlap may be projected to a center at the front of the lamp.

In the vehicle lamp,
the optical elements may be reflecting elements, and
the reflecting elements may be each made to switch between an incident position where light from the light source is reflected so as to be incident on the projection lens and a non-incident position where light from the light source is reflected so as not to be incident on the projection lens, independently of the others.

In the vehicle lamp,
the optical elements may be liquid crystal elements, and
the crystal elements may be each made to switch between a light transmitting state where light from the light source is transmitted so as to be incident on the projection lens and a non-light-transmitting state where light from the light source is cut off so as not to be incident on the projection lens, independently of the others.

A method for controlling a vehicle lamp of the invention which can solve the problem comprises:
a projection lens,
a two-dimensional image forming device including a projection surface positioned near a rear focal point of the projection lens, and
a light source configured to irradiate the two-dimensional image forming device with light,
the projection surface being formed by a plurality of optical elements that can be driven independently of the others, the method comprising:
driving the two-dimensional image forming device so as to form illumination patterns simultaneously and individually on a plurality of projection areas on the projection surface; and
projecting the plurality of illumination patterns to the front of the lamp by the projection lens so as to form a single or a plurality of light distribution patterns.

Advantageous Effects of Invention

According to the invention, a vehicle lamp is provided that can form a light distribution pattern required therefor effectively even with the existing DMD and a method for controlling the vehicle lamp.

DESCRIPTION OF EMBODIMENTS

Hereinafter, referring to the drawings, an embodiment of the invention will be described in which a vehicle lamp according to the invention is applied to a vehicle headlamp. A vehicle headlamp 1 according to this embodiment is mounted at a front side of a vehicle to illuminate the front of the vehicle.

Figure 1:
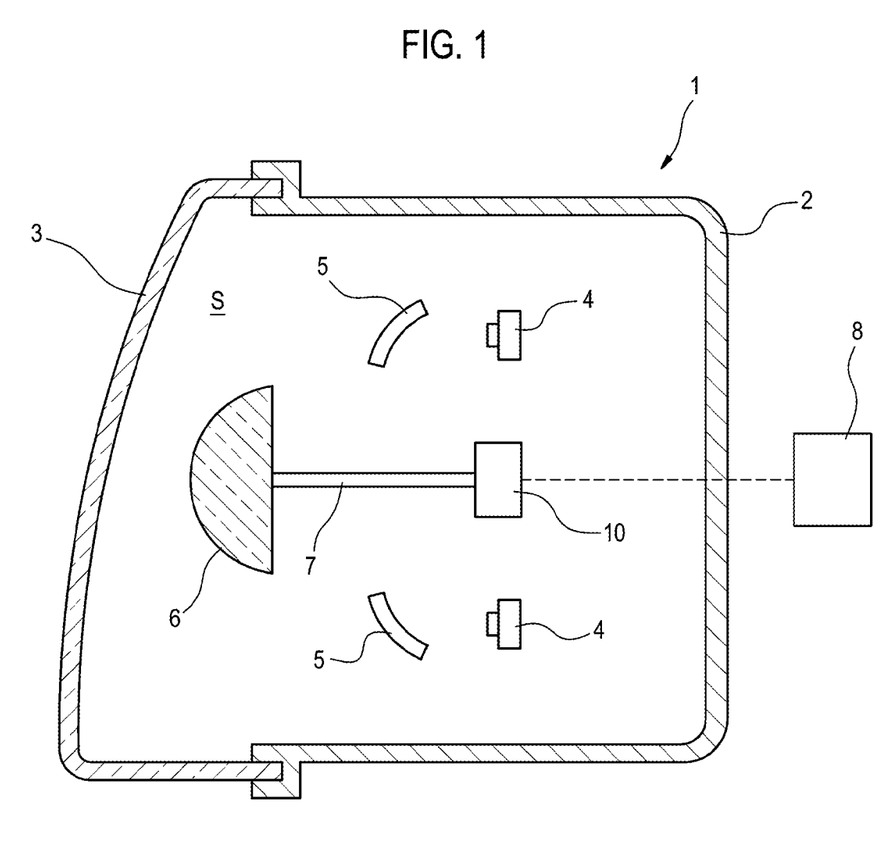
FIG. 1 is a side sectional view of a vehicle headlamp according to an embodiment of the invention.

FIG. 1 is a side sectional view of the vehicle headlamp 1 according to the embodiment. In the following description, a direction in which light is illuminated by the vehicle headlamp 1 will be referred to as "front (front of the lamp)" and a direction opposite thereto will be referred to as "rear."

As shown in FIG. 1, the vehicle headlamp 1 includes a housing 2 that includes an opening portion that is opened to the front of the lamp and an outer cover 3. The outer cover 3 is attached to the housing 2 so as to cover the opening portion of the housing 2 and defines a lamp chamber S with the housing 2. The outer cover 3 is a clear member that is formed from a transparent resin.

Provided in the lamp chamber S are a pair of LEDs 4 as a light source, a DMD (Digital Micromirror Device) 10 as a two-dimensional image forming device, a pair of reflectors 5 that reflect light from the pair of LEDs 4 towards the DMD 10, a projection lens 6 that projects light from the DMD 10 to the front of the lamp, and a light cut-off plate 7 that extends in a longitudinal direction of the lamp.

Figure 2:
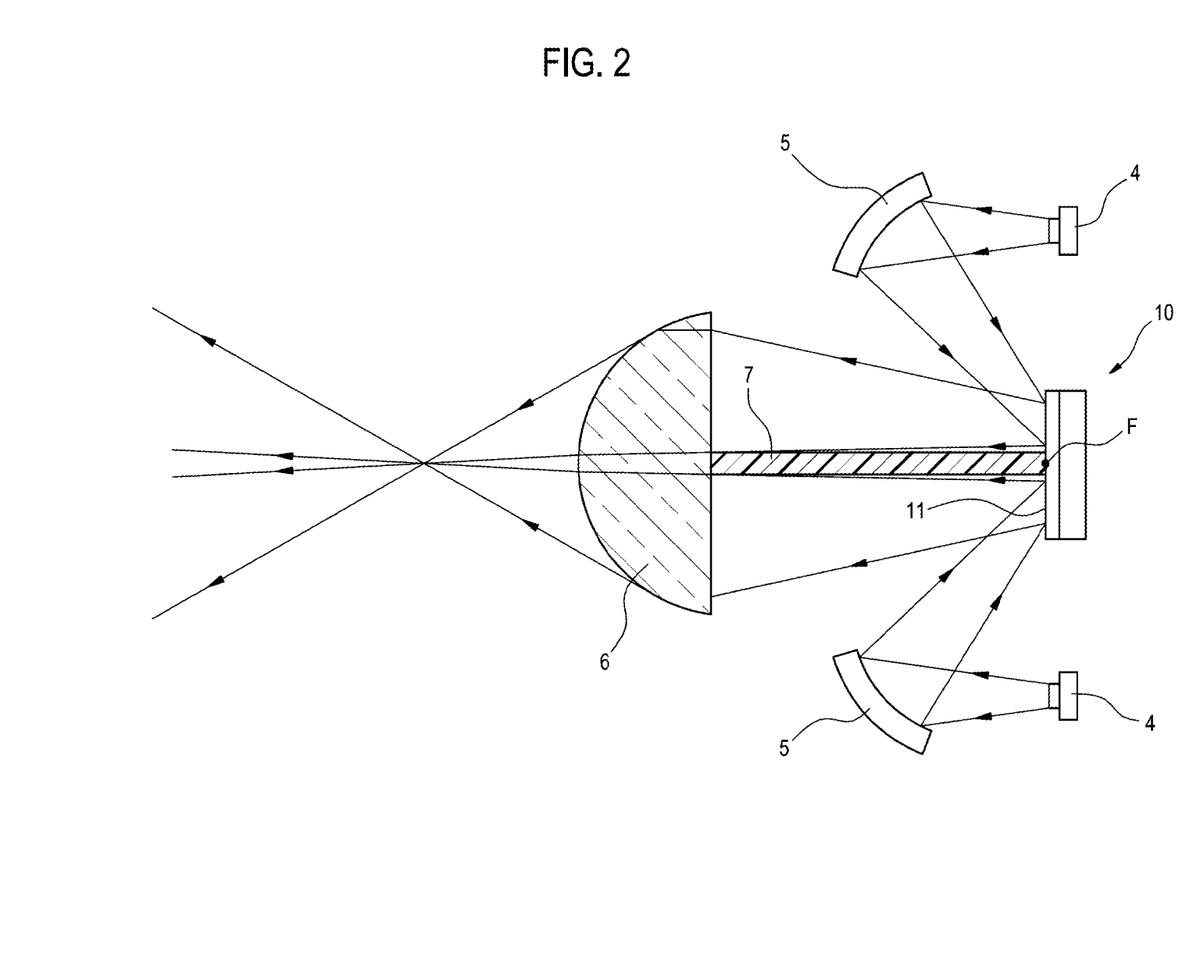
FIG. 2 is a partial enlarged view of the vehicle headlamp as shown in FIG. 1.

FIG. 2 is an enlarged view showing the DMD 10 and the vicinity of the projection lens 6 in FIG. 1 in an enlarged fashion. As shown in FIG. 2, a surface of the DMD 10 that is oriented to the front of the lamp is made into a projection surface 11. The reflectors 5 each have a reflecting surface that reflects light emitted from the corresponding LED 4 towards the projection surface 11 of the DMD 10. Of the reflectors 5, the reflector 5 reflects light from the LED 4 towards an upper projection area 13a (refer to FIG. 4A) of the projection surface 11, and the other reflector 5 reflects light from the LED 4 towards a lower projection area 13b (refer to FIG. 4A) of the projection surface 11. By doing so, the light is illuminated on to the whole of the projection surface 11 by the pair of reflectors 5.

The projection lens 6 is provided so that a rear focal point F thereof coincides substantially with the projection surface 11 of the DMD 10. An illumination pattern that is formed on the projection surface 11 of the DMD is projected to the front of the lamp in an enlarged fashion while being inverted vertically and horizontally.

Figure 3:
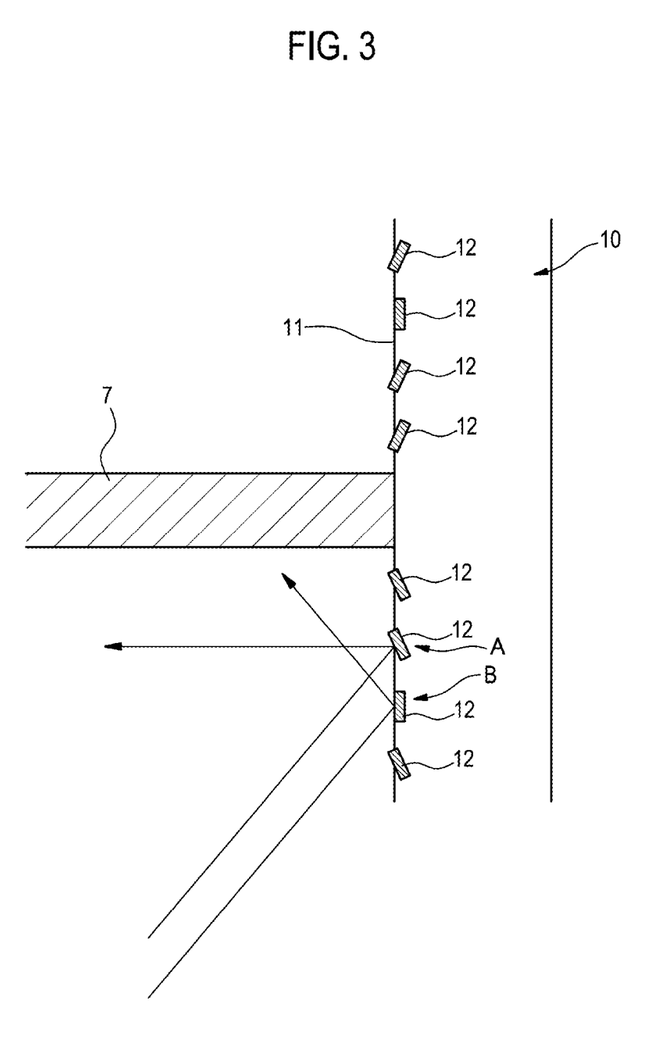
FIG. 3 is an enlarged view showing the vicinity of a projection surface of a DMD.

FIG. 3 is an enlarged view showing the vicinity of the projection surface 11 of the DMD 10 in an enlarged fashion. The DMD is formed by making use of the MEMS (Micro Electro Mechanical Systems) technology. A plurality of reflecting elements (optical elements) 12 are arranged into a matrix on a single substrate of the DMD 10, and the projection surface 11 of the DMD 10 is formed by the plurality of reflecting elements 12 that are arranged into a surface-like fashion. Each reflecting element 12 is provided so as to rotate around a rotational shaft. A voltage is applied individually to the reflecting elements 12, whereby the reflecting elements 12 can individually switch between a state in which the reflecting element 12 stays stationary with a posture indicated by an arrow A and a state in which the reflecting element 12 stays stationary with a posture indicated by an arrow B independently of the others.

When the reflecting element 12 stays in the posture indicated by the arrow A (where a reflecting surface forms an angle of about 45 degrees relative to the projection surface 11), a light L1 that is incident thereon from the reflector 5 is reflected to the front of the lamp to be incident on the projection lens 6. This allows the light from the LED 4 to be emitted to the front of the lamp via the projection lens 6. In this way, when the reflecting element 12 is staying in the posture where the light from the LED 4 is reflected so as to be incident on the projection lens 6, the reflecting element 12 will be referred to as staying in an incident position in the following description.

On the other hand, when the reflecting element 12 stays in the posture indicated by the arrow B (where the reflecting surface becomes substantially parallel to the projection surface 11), a light L2 that is incident thereon from the reflector 5 is reflected towards the light cut-off plate 7 and is not incident on the projection lens 6. In this way, when the reflecting element 12 is staying in the posture where the light from the LED 4 is reflected so as not to be incident on the projection lens 6, the reflecting element 12 will be referred to as staying in a non-incident position in the following description.

The reflecting elements 12 are driven individually in response to commands from a control unit 8 (refer to FIG. 1) so as to switch between the incident position and the non-incident position independently of the others. By causing the reflecting elements 12 to switch between the incident position and the non-incident position independently of the others, an illumination pattern can be formed on the projection surface 11 as will be described below.

Figure 4A:
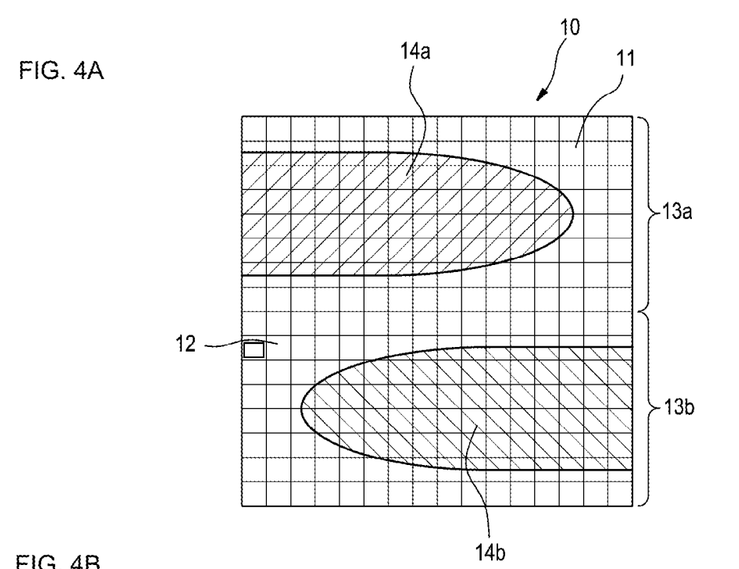
FIG. 4A is a view showing illumination patterns formed on the projection surface.
Figure 4B:
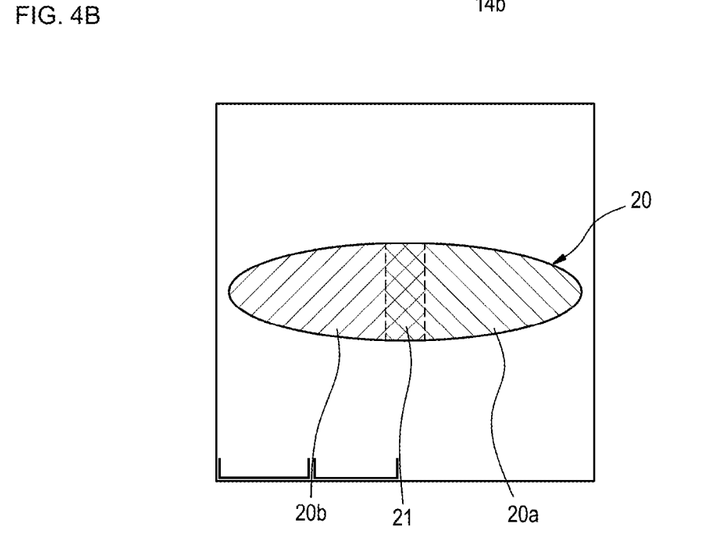
FIG. 4B is a view showing a light distribution pattern formed on an imaginary screen.

FIG. 4A is a front view of the projection surface 11 of the DMD 10, and FIG. 4B shows a high-beam light distribution pattern 20 that is formed by the projection surface 11 shown in FIG. 4A. FIG. 4B shows the light distribution pattern that is formed on an imaginary vertical screen that is provided 25 meters ahead of the vehicle headlamp 1. In FIGS. 4A and 4B, a hatched area denotes an area where light is illuminated, and a non-hatched area denotes an area where light is not illuminated. Although the reflecting elements 12 are drawn large in FIG. 4A, it is desirable that 10,000 to 1,000,000 reflecting elements 12 are formed on the projection surface 11 in reality.

In this embodiment, as shown in FIG. 4A, the projection surface 11 of the DMD 10 is divided vertically into two projection areas 13a, 13b. An illumination pattern 14a that forms a right-hand side part 20a of a high-beam light distribution pattern 20 as seen from the driver can be formed on the upper projection area 13a. An illumination pattern 14b that forms a left-hand side part 20b of the high-beam light distribution pattern 20 as seen from the driver can be formed on the lower projection area 13b of the projection surface 11. These illumination patterns 14a, 14b can be formed simultaneously.

As this occurs, in the reflecting elements 12 on the projection surface 11, the reflecting elements 12 that belong to the area where the light distribution pattern 20 is formed are caused to take the incident positions, and the other reflecting elements 12 are caused to take the non-incident positions, whereby the illumination patterns 14a, 14b are formed. Namely, in FIG. 4A, the reflecting elements 12 that belong to the areas where the illumination patterns 14a, 14b are formed are cause to take the incident positions, whereas the reflecting elements 12 that belong to areas other than the areas where the illumination patterns 14a, 14b are formed are cause to take the non-incident positions.

By doing so, in the light that has been incident on the whole area of the projection surface 11 from the LEDs 4, only the light that has been incident on the illumination patterns 14a, 14b is reflected towards the projection lens 6. As this occurs, the projection lens 6 projects the illumination pattern 14a that is formed on the upper projection area 13a and the illumination pattern 14b that is formed on the lower projection area 13b to the front of the lamp so that the illumination patterns 14a, 14b are continuous in the horizontal direction. This forms a high-beam light distribution pattern 20 that is elongated in the horizontal direction at the front of the lamp.

Figure 5:
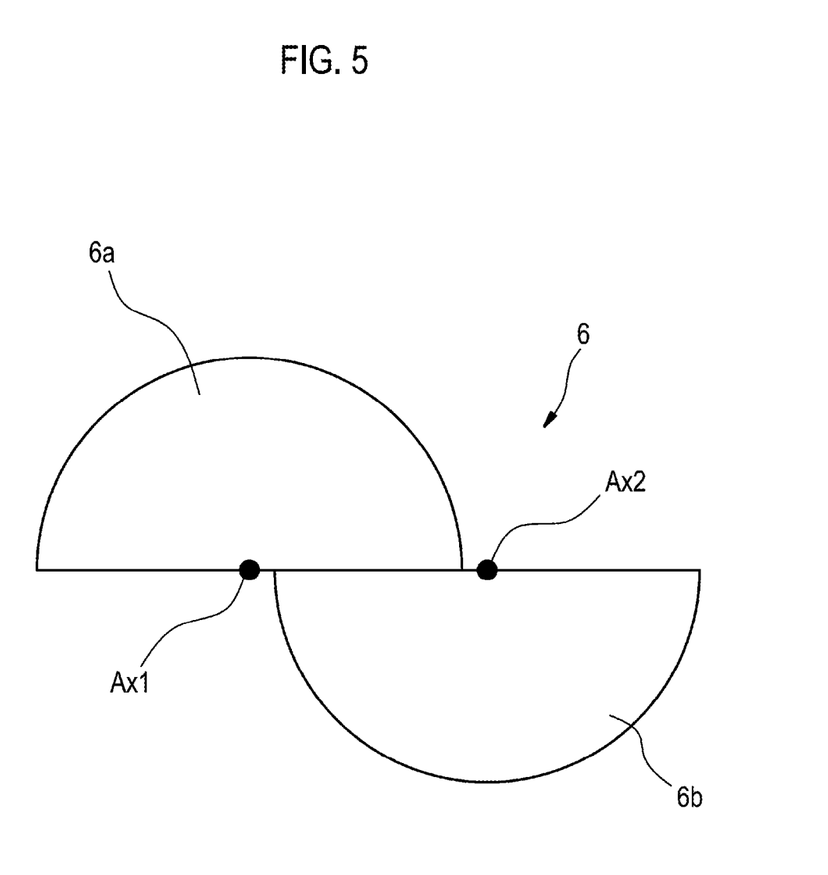
FIG. 5 is a front view of a projection lens.

FIG. 5 is a front view of the projection lens 6 that causes the illumination patterns 14a, 14b to overlap. The projection lens 6 is shaped to be divided vertically and is formed in such a way that an optical axis Ax1 of an upper portion 6a and an optical axis Ax2 of a lower portion 6b of the projection lens 6 are offset from each other. Using the projection lens 6 shaped in the way described above can overlap, at the center of the lamp, the illumination pattern 14a formed on the upper portion and the illumination pattern 14b formed on the lower portion of the projection surface 11 for projection to the front of the lamp.

In this embodiment, the illumination pattern 14a formed on the upper projection area 13a and the illumination pattern 14b formed on the lower projection area 13b are projected to the front of the lamp in such a way that a left end portion of the illumination pattern 14a and a right end portion of the illumination pattern 14b partially overlap at a central portion 21 lying at the front of the lamp. This illuminates the central portion 21 at the front of the lamp brightly, thereby making it possible to enhance the visibility of the driver.

The light cut-off plate 7 prevents the light that is incident on the lower projection area 13b of the projection surface 11 from being incident on the upper portion 6a of the projection lens 6. The light cut-off plate 7 also prevents the light that is incident on the upper projection area 13a of the projection surface 11 from being incident on the lower portion 6b of the projection lens 6. This prevents an unintended combination of the illumination patterns 14a, 14b for projection to the front of the lamp.

Figure 6:
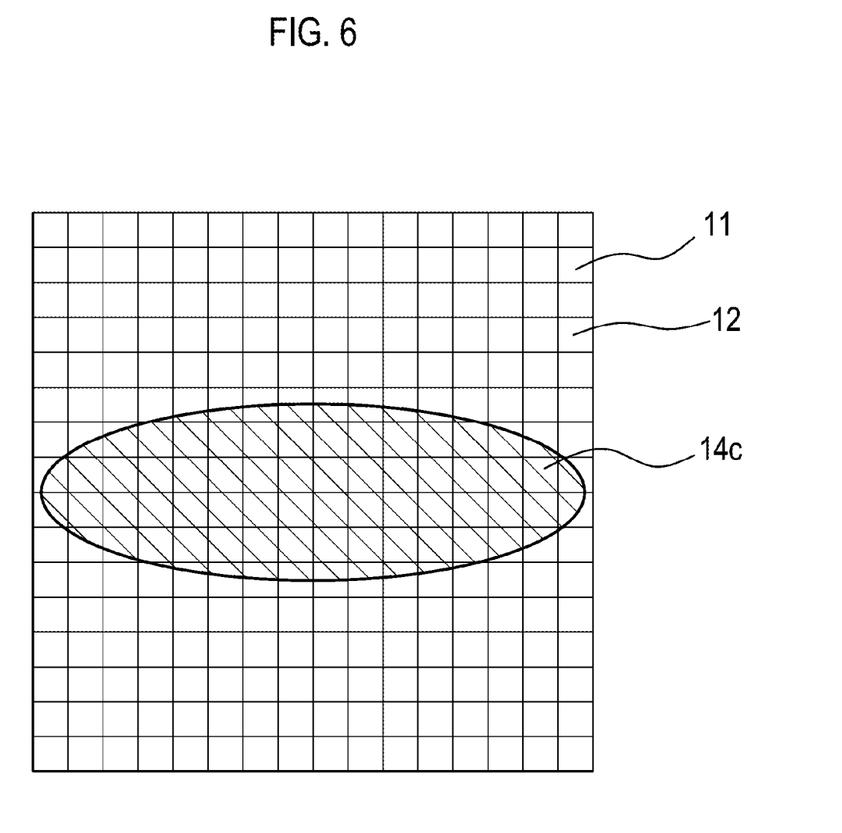
FIG. 6 is a view showing an illumination pattern formed on a projection surface of a vehicle lamp according to a comparison example.

FIG. 6 is a view showing an illumination pattern that is formed on a projection surface 11 of a DMD 10 of a vehicle lamp according to a comparison example. As show in FIG. 6, in the event that an illumination pattern 14c that has a shape of a light distribution pattern to be formed is formed directly on the projection surface 11, there are many reflecting elements 12 that do not reflect the light on the projection surface 11 (that is, those staying in non-incident positions).

In particular, the aspect ratio of a DMD that is used in an existing television set or projector is 1:1 to 1:2, whereas the aspect ratio of a light distribution pattern for a vehicle is on the order of 1:4 to 1:6, in which the width is larger than the height. Because of this, in the event that the illumination pattern 14c is formed on the projection surface 11 of which the whole area is made as a single projection area as shown in FIG. 6, a part of the projection surface 11 in the height direction do not contribute to the formation of the illumination pattern 14c. Therefore, the reflecting elements 12 cannot be used effectively.

Consequently, the illumination pattern 14c is formed by a small number of reflecting elements 12, and therefore, irregularities or serrations are produced in the contour of the illumination pattern 14c. Alternatively, only part of light from LEDs 4 is incident on the projection lens 6, as a result of which the brightness of a light distribution pattern 20 that is projected is reduced.

However, as shown in FIG. 4A, according to the vehicle headlamp 1 and the control method therefor of this embodiment, the projection surface 11 is divided into the plurality of projection areas 13a, 13b, and the illumination patterns 14a, 14b are formed simultaneously for the projection areas 13a, 13b, respectively. The plurality of illumination patterns 14a, 14b are projected to the front of the lamp by the projection lens 6, whereby the light distribution pattern 20 is formed.

Because of this, according to the vehicle headlamp 1 and the control method therefor of this embodiment, the illumination patterns 14a, 14b can be formed by using also the reflecting elements 12 that belong to the areas where the illumination pattern 14c is not formed in the comparison example shown in FIG. 6 (for example, the areas lying near upper and lower end portions of the projection surface 11 in FIG. 6), and hence, many of the reflecting elements 12 can be used to form the illumination patterns 14a, 14b. Namely, the reflecting elements 12 that do not contribute to the formation of the light distribution pattern 20 can be reduced.

Consequently, even in the case where the existing DMD is used, the light distribution pattern 20 can be formed by making effective use of the reflecting elements 12. By forming the light distribution pattern 20 in that way, it is possible to provide the vehicle headlamp 1 that can control the light distribution pattern finely so that the light is not illuminated on only to, for example, the areas which cause glare to a preceding vehicle or a pedestrian and the control method therefor. In addition, since most of the light that is incident on the projecting surface 11 is allowed to be incident on the projection lens 6, it is possible to project the bright light distribution pattern 20.

Additionally, the vehicle lamp can be provided inexpensively by using the existing DMD 10 without using a special horizontally elongated DMD 10 to form a horizontally elongated light distribution pattern. Additionally, when wishing to form a light distribution pattern 20 having a smooth contour by using a specific number of or more (for example, 1,000,000 or more) reflecting elements 12, such a light distribution pattern 20 can be formed by using the DMD 10 having about necessary numbers of reflecting elements 12. In this way, the vehicle lamp that can form a highly accurate light distribution pattern 20 can be provided inexpensively.

Thus, while the vehicle lamp and the control method therefor according to the invention have been described by reference to the embodiment, the vehicle lamp of the invention is not limited to the embodiment described above but can be modified, improved or the like as required. For example, while the invention is described as being applied to the vehicle headlamp in the embodiment described above, the invention may be applied to a vehicle marker lamp. Additionally, while the invention is described as adopting the LEDs as the light source, known light sources can be adopted such as organic EL, LD (Laser Diode), discharge bulb, or the like.

In addition, while the invention has been described as being applied to form the high-beam light distribution pattern, the invention is not limited thereto. According to the vehicle lamp of the invention, various illumination patterns can be formed on the projection surface 11 by causing the plurality of reflecting elements 12 between the incident position and the non-incident position independently of the others.

For example, various illumination patterns can be formed sequentially one by one on the same projection surface 11 in place of the illumination patterns 14a, 14b shown in FIG.

4A. By doing so, light distribution patterns having various shaped can be projected in addition to the normal high-beam light distribution pattern, including a high-beam light distribution pattern for a single lane, a low-beam light distribution pattern with a cut-off line, and the like. By doing so, various light distribution patterns can be formed by a single optical unit like the one described in the embodiment.

Further, a light distribution pattern that can change its shape can be projected by causing part of reflecting elements 12 to switch between the incident positions and the non-incident positions so that an illumination pattern on the projection surface 11 is changed partially.

For example, the light distribution pattern can be changed in association with an ADB (Adaptive Driving Beam) control as below. Firstly, the high-beam light distribution pattern is projected by the vehicle headlamp 1 as shown in FIGS. 4A and 4B. Next, when a preceding vehicle is detected, part of the reflecting elements 12 that are included in the areas of the illumination patterns 14a, 14b shown in FIG. 4A are driven to switch to the non-incident positions so that a non-illuminated area is formed in the high-beam light distribution pattern so as to prevent the preceding vehicle from being illuminated by the light from the vehicle headlamp 1. Further, part of the reflecting elements 12 to be positioned at the non-illuminated areas is sequentially caused to switch to the non-incident positions so that the non-illuminated area moves to follow the moving preceding vehicle. In this way, the light distribution pattern that can change variously can be projected only by driving the reflecting elements 12 independently of the others.

Figure 7:
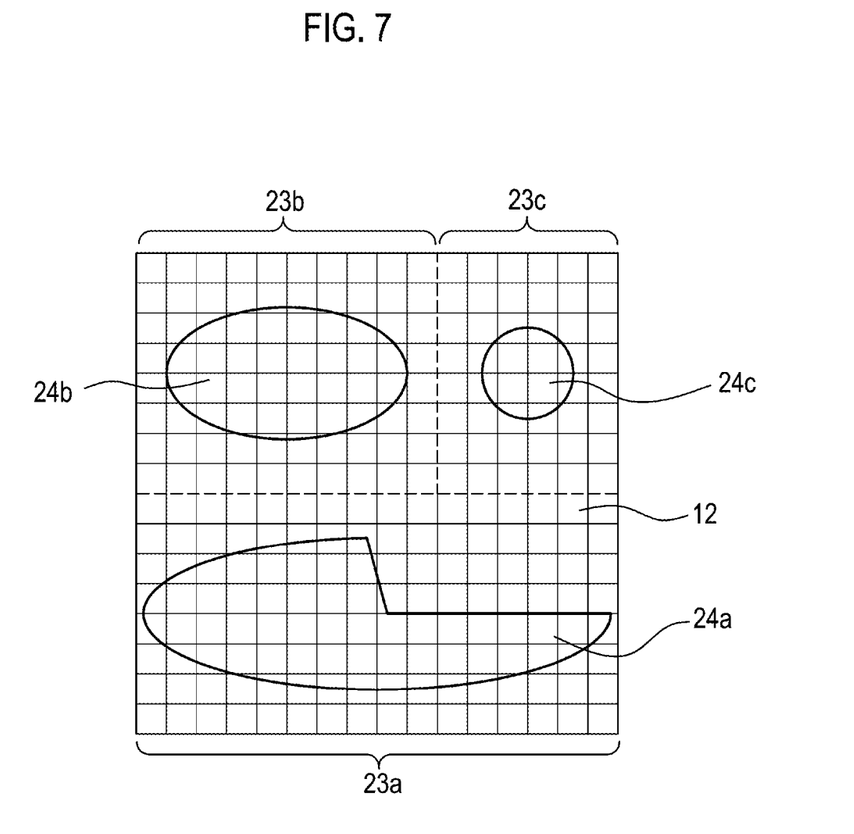
FIG. 7 is a view showing an illumination pattern formed on a projection surface of a vehicle lamp according to a modified example.

In addition, a light distribution pattern to be projected is not limited to a single light distribution pattern. For example, FIG. 7 shows a projection surface 11 of a DMD 10 of a vehicle lamp according to a modified example. This projection surface 11 is divided into three projection areas. An illumination pattern 24a that forms a low-beam light distribution pattern, an illumination pattern 24b that forms a high-beam light distribution pattern and an illumination pattern 24c that forms a turn signal light distribution pattern are formed individually in those projection areas. According to this modified example, the low-beam light distribution pattern, the high-beam light distribution pattern and the turn signal light distribution pattern can be projected simultaneously.

In addition, the single light distribution pattern 20 is formed by the two illumination patterns 14a, 14b in the embodiment shown in FIGS. 4A and 4B. However, as described in the modified example shown in FIG. 7, the configuration may be adopted in which one illumination pattern forms one light distribution pattern.

Further, in the embodiment described above, the reflecting elements 12 of the DMD 10 are described as rotating around one rotational shaft to stop in the two specific postures. However, the invention is not limited thereto. For example, when a configuration is adopted in which reflecting elements 12 can stop at arbitrary angles, the reflecting elements 12 can be made to stop in, for example, a first incident position and a second incident position that have different reflecting angles to form different illumination patterns. Alternatively, reflecting elements 12 may be adopted which can rotate around two rotational shafts.

In the embodiment described above, the reflecting elements 12 having a substantially square shape are arranged in a grid-like fashion to form the projection surface 11. However, for example, reflecting elements 12 having a diamond shape are arranged with no space to form a projection surface 11.

In the embodiment described above, the projection lens 6 having the shape shown in FIG. 5 is adopted to project the two illumination patterns 14a, 14b so as to overlap. However, two illumination patterns may be projected so as to overlap by, for example, devising the shape of the reflectors 5 that reflect light from the LEDs 4 towards the DMD 10 while using a general projection lens having a single optical axis.

Figure 8:
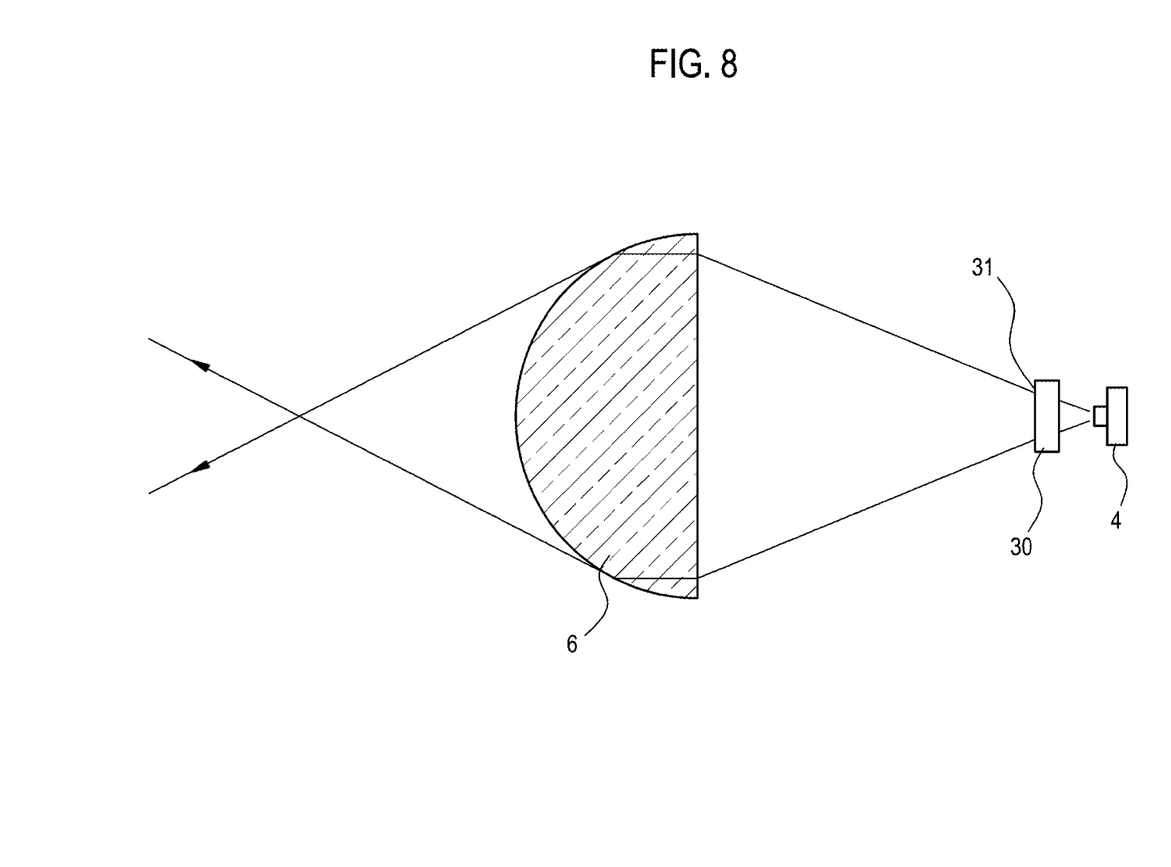
FIG. 8 is a view similar to FIG. 2 which shows a vehicle lamp according to the modified example.

Additionally, in the embodiment described above, the DMD 10 is described as functioning as the two-dimensional image forming device. However, the invention is not limited thereto. For example, a liquid crystal device 30 can be adopted as a two-dimensional image forming device. FIG. 8 is a view similar to FIG. 2 which shows a vehicle lamp that adopts the liquid crystal device 30 as the two-dimensional image forming device.

In this modified example, an LED 4 is provided on a side of the liquid crystal device 30 that is opposite to a side that faces a projection lens 6. A projection surface 31 that is provided on the side of the liquid crystal device 30 that faces the projection lens 6 is inverted vertically and horizontally while being enlarged for projection to the front of the lamp.

Figure 9:
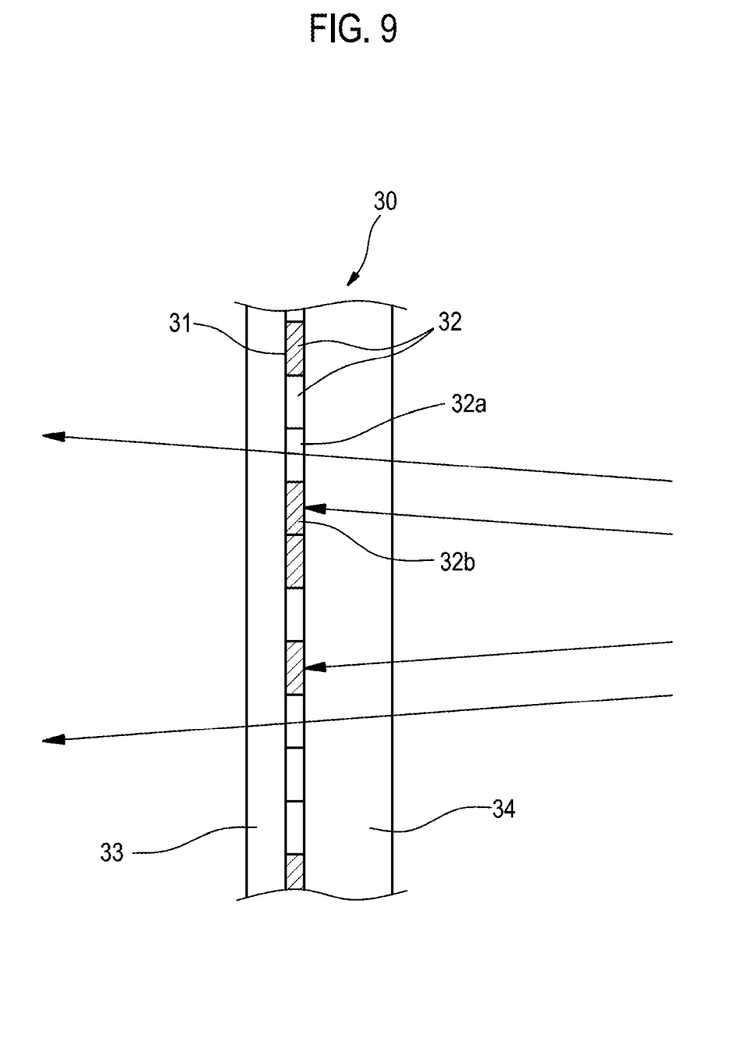
FIG. 9 is an enlarged view of the vicinity of a projection surface of the vehicle lamp as shown in FIG. 8.

FIG. 9 is an enlarged view of the projection surface 31 of the liquid crystal device. A plurality of liquid crystal elements (optical elements) 32 are arranged into a matrix on the projection surface 31 of the liquid crystal device 30. These liquid crystal elements 32 are sealed individually into the matrix between a glass cover 33 and a transparent electrode 34. These liquid crystal elements 32 are made to switch independently of the others between a light transmitting state denoted by 32a in which liquid crystals are arranged at random to transmit light from the LED 4 so as to be incident on the projection lens 6 and a non-light-transmitting state denoted by 32b in which liquid crystals are arranged in one direction to cut off light from the LED 4 so as not to be incident on the projection lens 6.

In this way, in this modified example, too, the plurality of liquid crystal elements 32 are made to switch between the light transmitting state and the non-light-transmitting state independently of the others. Because of this, the liquid crystal elements 32 can be driven independently of the others to form various illumination patterns. The projection surface 31 is divided into a plurality of projection areas as shown in FIG. 4A or FIG. 7 and the liquid crystal device 30 can be driven so as to form illumination patterns simultaneously on the individual projection areas. This enables the plurality of illumination patterns that are formed individually on the projection areas to be projected to the front of the lamp by the projection lens 6, whereby various light distribution patterns can be formed.

Thus, the invention has been described in detail and by reference to the specific embodiment and its modified examples. However, it is obvious to those skilled in the art to which the invention pertains that various alterations or modifications can be made thereto without departing from the spirit and scope of the invention.

This patent application is based on Japanese Patent Application (No. 2012-146195) filed on Jun. 29, 2012, the contents of which are incorporated herein by reference.

INDUSTRIAL APPLICABILITY

According to the invention, the vehicle lamp and the control method therefor are provided which can form the light distribution pattern that is required for the vehicle lamp even with the existing DMD.

REFERENCE SIGNS LIST

1: vehicle headlamp; 2: housing; 3: outer cover; 4: LED (light source); 5: reflector; 6: projection lens; 7: light cut-off plate; 10: DMD (two-dimensional image forming device); 30: liquid crystal device (two-dimensional image forming device); 11, 31: projection surface; 12, 12a, 12b, 12c, 12d: reflecting element (optical element); 13a, 13b, 23a, 23b, 23c: projection area; 14a, 14b, 24a, 24b, 24c: illumination pattern; 20: light distribution pattern.

The invention claimed is:

1. A vehicle lamp comprising:
a projection lens;
a two-dimensional image forming device including a projection surface positioned near a rear focal point of the projection lens; and
a light source configured to irradiate the two-dimensional image forming device with light, wherein:
the projection surface comprising a plurality of optical elements arranged into a matrix on a single substrate, the plurality of optical elements being driven independently from one another,
in the projection surface, a first illumination pattern and a second illumination pattern formed simultaneously and individually on a first projection area and a second projection area, respectively, the first projection area and the second projection area arranged along a first direction, and
the first and the second illumination patterns are projected to the front of the lamp by the projection lens so as to be re-arranged along a second direction different from the first direction, and
wherein the first and the second illumination patterns are projected so as to partially overlap each other by the projection lens to form the single light distribution pattern.

2. The vehicle lamp according to claim 1, wherein a portion of each of the first and the second illumination patterns that are projected so as to overlap is projected to a center at the front of the lamp.

3. The vehicle lamp according to claim 1, wherein:
the optical elements comprise reflecting elements, and
each of the reflecting elements is configured to switch between an incident position where light from the light source is reflected so as to be incident on the projection lens and a non-incident position where light from the light source is reflected so as not to be incident on the projection lens, independently from one another.

4. The vehicle lamp according to claim 1, wherein the optical elements comprise liquid crystal elements, and each of the crystal elements is configured to switch between a light transmitting state where light from the light source is transmitted so as to be incident on the projection lens and a non-light-transmitting state where light from the light source is cut off so as not to be incident on the projection lens, independently from one another.

5. The vehicle lamp according to claim 1, wherein the projection lens comprises:
a first portion; and
a second portion offset from the first portion.

6. The vehicle lamp according to claim 5, wherein an optical axis of the first portion is offset from an optical axis of the second portion.

7. A method for controlling a vehicle lamp comprising:
a projection lens,
a two-dimensional image forming device including a projection surface positioned near a rear focal point of the projection lens, and
a light source configured to irradiate the two-dimensional image forming device with light,
the projection surface comprising a plurality of optical elements arranged into a matrix on a single substrate, the plurality of optical elements being driven independently from one another, the method comprising:
driving the two-dimensional image forming device so as to form a first illumination pattern and a second illumination pattern simultaneously and individually on a first projection area and a second projection area of the projection surface, the first projection area and the second projection area arranged along a first direction; and
projecting the first and the second illumination patterns to the front of the lamp by the projection lens so as to re-arranged along a second direction different from the first direction, and
wherein the first and the second illumination patterns are projected so as to partially overlap each other by the projection lens to form the single light distribution pattern.

8. A vehicle lamp comprising:
a projection lens comprising:
a first portion; and
a second portion offset from the first portion;
a two-dimensional image forming device including a projection surface positioned near a rear focal point of the projection lens; and
a light source configured to irradiate a first illumination pattern on a first projection area of the projection surface and a second illumination pattern on a second projection area of the projection surface, the first and the second projection surface arranged in a first direction from each other,
wherein the projection lens is configured to re-arrange the first illumination pattern and the second illumination pattern along a second direction different from the first direction.

9. The vehicle lamp according to claim 8, wherein the first direction and the second direction are substantially perpendicular from each other.

* * * * *